(12) United States Patent
Aringsmann et al.

(10) Patent No.: US 12,341,381 B2
(45) Date of Patent: Jun. 24, 2025

(54) METHOD FOR PRODUCING A ROTOR, AND ROTOR

(71) Applicant: Bayerische Motoren Werke Aktiengesellschaft, Munich (DE)

(72) Inventors: Dirk Aringsmann, Holzkirchen (DE); Florian Beck, Freising (DE); Andreas Jahnke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 17/924,216

(22) PCT Filed: Apr. 19, 2021

(86) PCT No.: PCT/EP2021/060026
§ 371 (c)(1),
(2) Date: Nov. 9, 2022

(87) PCT Pub. No.: WO2021/228493
PCT Pub. Date: Nov. 18, 2021

(65) Prior Publication Data
US 2023/0179046 A1   Jun. 8, 2023

(30) Foreign Application Priority Data
May 14, 2020  (DE) .................... 10 2020 113 110.0

(51) Int. Cl.
*H02K 1/28*       (2006.01)
*H02K 1/24*       (2006.01)
*H02K 15/022*     (2025.01)

(52) U.S. Cl.
CPC ............. *H02K 1/28* (2013.01); *H02K 1/24* (2013.01); *H02K 15/022* (2013.01)

(58) Field of Classification Search
CPC   H02K 1/28; H02K 1/26; H02K 1/265; H02K 15/022; H02K 15/024;
(Continued)

(56) References Cited

U.S. PATENT DOCUMENTS 7,667,367 B2 *   2/2010   Matsuo .................. H02K 1/148
                                                    310/216.008
7,859,162 B2 *  12/2010   Yamamoto ............. H02K 1/148
                                                    310/214
2009/0134736 A1  5/2009   Yamamoto et al.

FOREIGN PATENT DOCUMENTS

DE            295 00 984 U1   5/1995
DE       10 2009 037 991 A1   2/2011
(Continued)

OTHER PUBLICATIONS

Machine Translation of JP_2015139227_A (Year: 2015).*
(Continued)

*Primary Examiner* — Alexander A Singh
*Assistant Examiner* — Charlie Frank Mann, Jr.
(74) *Attorney, Agent, or Firm* — Crowell & Moring LLP

(57) ABSTRACT

A method for producing a rotor includes providing lamella elements and arranging the lamella elements to form a lamella bundle where the lamella bundle has webs. End plates are arranged at respective end faces of the lamella bundle where the end plates axially support the lamella bundle. The lamella bundle is axially fixed or pretensioned by winding conductor material around the webs and a rotor shaft is arranged in the fixed or pretensioned lamella bundle.

10 Claims, 1 Drawing Sheet

(58) Field of Classification Search
CPC ............... H02K 15/026; H02K 15/028; H02K 15/0031; H02K 15/0435
USPC .................................. 310/216.113–213.119
See application file for complete search history.

(56) References Cited

FOREIGN PATENT DOCUMENTS

| | | |
|---|---|---|
| EP | 0 535 706 A1 | 4/1993 |
| JP | 56-35848 U | 4/1981 |
| JP | 2015139227 A * | 7/2015 |

OTHER PUBLICATIONS

PCT/EP2021/060026, International Search Report dated Jul. 8, 2021 (Two (2) pages).
German Search Report issued in German application No. 10 2020 113 110.0 dated Mar. 2, 2021, with Statement of Relevancy (Eight (8) pages).

* cited by examiner

METHOD FOR PRODUCING A ROTOR, AND ROTOR

BACKGROUND AND SUMMARY OF THE INVENTION

The present invention relates to a method for producing a rotor, in particular for an electrically excited electrical machine, and a rotor for an electrically excited electrical machine.

In order to prevent eddy current losses, sheet metal bundles of the type in question comprise thin stamped sheet metal lamellas. The arrangement of the rotor shaft in such a lamella bundle is generally carried out by means of press-joining, wherein the sheet metal bundle is heated and the rotor shaft is cooled. This is quite problematic since the sheet metal lamellas become deformed during cooling by the tensions which are brought about during stamping. Without a support or axial tension, the sheet metal bundle would consequently tilt or bulge laterally. In order to compensate for this undesirable effect, such sheet metal bundles are often screwed or axially tensioned by means of additional components. However, this is complex in terms of technical production, increases the costs and also requires additional structural space.

An object of the present invention is therefore to provide a method for producing a rotor and a rotor which overcome the above-mentioned disadvantage and which are constructed in a simple manner and can be produced in a cost-effective manner.

According to the invention, a method for producing a rotor, in particular for an electrically excited electrical machine, comprises the steps of:
  providing a large number of lamella elements and arranging the lamella elements to form a lamella bundle, wherein the lamella bundle has or forms a large number of webs;
  arranging end plates at the end face of the lamella bundle, wherein the end plates are configured to axially support the lamella bundle;
  axially fixing or pretensioning the lamella bundle by winding conductor material around the webs or the end plates; and
  arranging, in particular by means of press-joining or transverse-joining, a rotor shaft in the fixed or prefixed or pretensioned lamella bundle.

Advantageously, the rotor-side winding is completely or at least partially arranged prior to the arrangement of the rotor shaft on the lamella bundle in order to achieve an in particular axial pretensioning thereof. In other words, the structure comprising the lamella bundle and the end plates which are arranged at the end is pretensioned or fixed, in particular axially pretensioned or fixed, by the winding which is arranged completely or at least in regions or partially in such a manner that no deformations occur when the lamella bundle cools after the rotor shaft has been joined.

Advantageously, the rotor shaft is arranged or joined in the lamella bundle by means of press-joining. Accordingly, between the corresponding opening of the lamella bundle and the rotor shaft, there acts a press-fit. Preferably, a transverse interference fit is produced. Prior to assembly, the rotor shaft is cooled and the lamella bundle is accordingly heated. Any deformations which occur, in particular in the region of the webs of the lamella bundle, are effectively prevented or compensated for by the pretensioning which is applied by the winding.

According to a preferred embodiment, a wire-shaped conductor material is used as the conductor material, for example, copper wire having a round, in particular, for example, circular cross section. In order to achieve a good pretensioning, the end plates are accordingly advantageously constructed in a flexurally rigid manner. Preferred materials are metal materials, such as, for example, aluminum or alloys thereof. Depending on the cost objective, the end plates may be processed (metal) cast components or also milled components. Non-metal materials, in particular also composite materials, for example, carbon-fiber-reinforced plastics materials, are also highly suitable as a result of the high levels of rigidity which can be achieved. A decisive aspect is to configure, as a result of the selection of the material and the structural configuration, the (flexural) rigidity at such a (high) level that a sufficient pretensioning can be applied to the lamella bundle via the winding.

Advantageously, the end plates continue the shape of the lamella bundle, thus accordingly also have webs. Advantageously, the end plates support the lamella bundle in each case at the end over the entire surface.

Preferably, the end plates have redirection regions which are configured to redirect the conductor material. Preferably, the redirection regions are constructed in a round or rounded manner in order to enable a smooth winding. This also enables winding with a high level of pretensioning being applied without the conductor material being damaged at edges or the like.

According to a preferred embodiment, the lamella elements are formed from electrical sheet steel. The shaping is preferably carried out in a cost-effective and operationally reliable manner by means of a separation method, in a particularly preferred manner by means of stamping. Alternative separation methods, in particular methods for dividing, such as (shearing) cutting, are also possible. The above-mentioned methods have in common that, as a result of the introduction of force into the lamella elements, tensions which can later lead to an undesirable deformation behavior are induced. Along the separation, cutting or stamping edge, the lamella elements have a stamping burr which in accordance with the cutting or stamping direction is orientated in a specific direction. The lamella element is deformed in this direction when cooling. In this instance, the burr is located substantially perpendicularly to a plane of the lamella element in principle.

The lamella elements can also be referred to as sheet metal lamellas. Accordingly, the lamella bundle is a sheet metal bundle.

Advantageously, the method comprises the steps of:
  orientating the lamella elements in the lamella bundle in such a manner that the stamping burr or the stamping burrs is/are orientated in a preferred direction; and
  providing a recess in the end plate which is orientated toward the preferred direction in order to absorb a deformation of the lamella bundle in the region of the rotor shaft.

Advantageously, as a result of the pretensioning which is applied by the winding, a deformation of the lamella bundle in the region of the webs can be effectively compensated for. Since the end plates are not infinitely rigid, it is not also possible to pretension the lamella bundle sufficiently by means of the end plates near the shaft. It has consequently been found to be extremely effective to permit a small deformation of the lamella bundle in this region. This is advantageously achieved in that the end plate which is directed toward the deformation direction of the lamella bundle has a corresponding recess or indentation in order to absorb this deformation. The above-mentioned preferred direction is in particular the direction in which a deformation is formed when the lamella bundle cools. This is produced, as already set out, by the direction of the stamping burr or the stamping burrs.

According to one embodiment, the method comprises the step of:
orientating the lamella elements in the lamella bundle in such a manner that the stamping burr is orientated in an alternating manner.

It may thereby advantageously be possible for the deformations to be compensated for, at least to a specific degree, inside the lamella bundle.

According to one embodiment, the lamella bundle comprises a large number of portions, wherein each portion comprises a large number of lamella elements. According to one embodiment, the method comprises the steps of:
arranging the lamella elements in such a manner that the stamping burrs are each orientated in an identical manner in the portions; and
orientating the portions in such a manner that the stamping burrs are orientated in an alternating manner in the portions.

A compensation for the deformation behavior can also thereby advantageously be compensated for.

According to one embodiment, the method comprises the step of:
arranging the rotor shaft in the preferred direction.

It may thereby advantageously be possible for any friction forces which are present between the rotor shaft and the lamella bundle to develop in the desired direction during the thermal joining operation.

According to one embodiment, the method comprises the step of:
arranging the rotor shaft in a joining direction until a desired position is reached, wherein the desired position is located in front of the end position with respect to the joining direction.

Advantageously, the deformation is taken into account when the rotor shaft is arranged so that, after cooling, a precise end position is reached. The axial displacement of the rotor shaft as a result of the deformation of the lamella bundle is advantageously compensated for by reserving a compensation value in the joining tool when joining the rotor shaft.

According to one embodiment, the method comprises the step of:
radially prefixing the lamella bundle during the winding operation.

To this end, there may advantageously be arranged in the rotor opening a shaft which at least temporarily serves to radially position the lamella elements.

According to one embodiment, the lamella bundle (together with the end plates) is axially prefixed in order to facilitate the arrangement of the winding.

The invention also relates to a rotor comprising a lamella bundle which is formed by a large number of lamella elements, wherein end plates are arranged at the end face on the lamella bundle, and wherein at least one end plate has a recess or an indentation which is configured to absorb an axial deformation of the lamella bundle.

The end plates each have support faces which are configured for end-face abutment against the lamella bundle. In the installed state, the support faces are orientated perpendicularly or substantially perpendicularly to the rotor axis. Advantageously, the support faces are constructed in an even or flat or planar manner. The above-mentioned recess or indentation is preferably constructed as an annular, in particular circular-ring-shaped, recess which is close to the shaft in the support face.

Advantageously, the lamella bundle is axially pretensioned in the region of the webs thereof by the winding which is applied prior to the arrangement of the rotor shaft. Advantageously, additional components, such as retention members, clamping elements, screw connections, etc., can be dispensed with. Such a rotor is optimum with regard to its structural space requirement. In addition, as a result of the omission of additional components, costs and weight can be saved.

According to one embodiment, the lamella elements have a stamping burr, wherein the stamping burr is orientated in the direction toward the recess. Advantageously, therefore, the above-mentioned recess can effectively absorb the deformation of the lamella bundle in the region of the rotor opening.

The invention is also directed toward an electric motor comprising a rotor which has been produced in accordance with the method according to the invention. It is preferably an electrically excited synchronous machine.

Other advantages and features will be appreciated from the following description of an embodiment of a rotor with reference to the appended Figures.

DETAILED DESCRIPTION OF THE DRAWINGS

Figure 1:
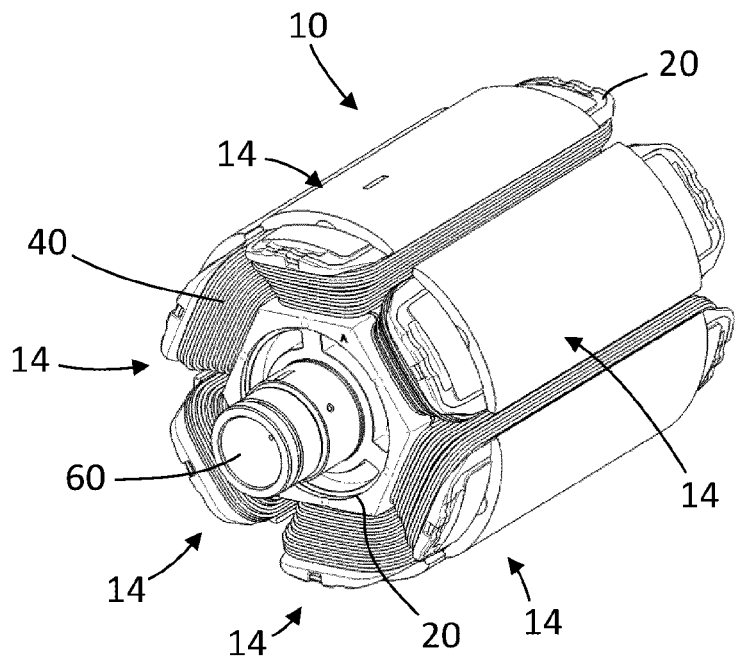
FIG. 1 shows a perspective view of an embodiment of a rotor.

FIG. 1 shows a perspective illustration of a rotor having a lamella bundle 10, wherein this forms a large number of webs 14. End plates 20 are formed in each case at the end face on the lamella bundle 10. A rotor shaft 60 is arranged in the lamella bundle 10. The arrangement is carried out in such a manner that the rotor shaft 60 is cooled, whilst the lamella bundle 10 is heated. Particularly if the lamella elements are stamped lamella elements, deformations occur during cooling. In order to compensate for these, conductor material is already wound around the lamella bundle 10 before the rotor shaft 60 is arranged, cf. the winding 40. It has been found that an axial pretensioning can thereby be achieved and counteracts a deformation of the lamella bundle, in particular in the region of the webs 14. This is enabled in particular in cooperation with the end plates 20 which are advantageously constructed to be correspondingly flexurally rigid.

Figure 2:
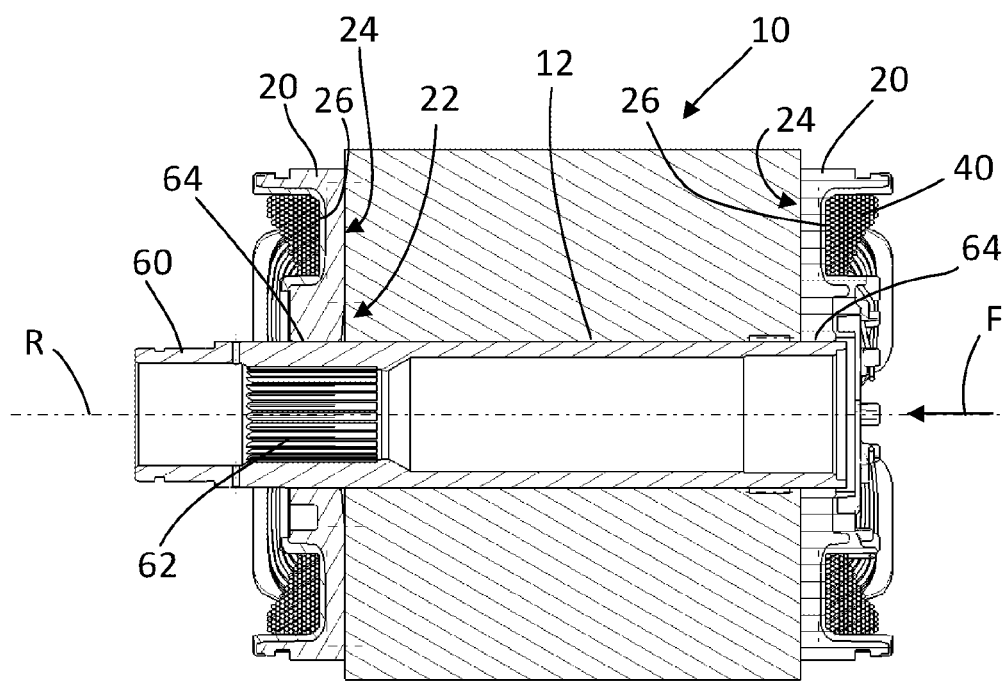
FIG. 2 shows a sectioned view of the rotor shown in FIG. 1.

FIG. 2 shows the rotor known from FIG. 1 as a cross section. The lamella bundle 10 can be seen in particular. This bundle is formed by a large number of individual, thin lamella elements which, however, cannot be seen in this illustration. The lamella bundle 10 has an opening 12 in which the rotor shaft 60 is arranged. This shaft is constructed in particular as a hollow shaft which comprises an arrangement region 62. This arrangement region 62 is advantageously configured to introduce or direct away a torque into the rotor. In the embodiment shown here, the arrangement region is constructed as a wedge tooth arrangement. The rotor shaft 60 extends along a rotor axis R. The end plates are arranged at the end side on the lamella bundle 10, wherein they also have in each case an opening 64, through which the rotor shaft 60 extends. The end plates 20 each have support faces 24 which are constructed for end-face abutment against the lamella bundle 10. The reference numerals 26 refer to the redirection regions of the end plates 20, against which the winding abuts and is redirected. In the embodiment shown here, the left end plate 20 has in the region of the support face 24 a recess 22 which is configured to absorb a deformation of the lamella bundle 10 in this region. The lamella elements which, as mentioned, cannot be seen in the embodiment shown here, are arranged in such a manner that the stamping burrs thereof are orientated in the direction toward the above-mentioned recess 22. During cooling, the lamella bundle 10 bulges in the region of the opening 12 in the direction toward the recess 22. By reserving this compensation space, there are no further occurrences of tension within the entire arrangement, comprising the end plates 20 and the lamella bundle 10. The geometry of the end state advantageously remains orthogonal with respect to the rotor axis R. The arrangement of the rotor shaft 60 is advantageously carried out in a joining direction F. It has been found that any friction forces which may be present between the rotor shaft 60 and the lamella bundle 10 during the thermal joining operation develop in the desired direction. As a result of the deformation behavior of the lamella bundle 10, there is an axial displacement of the rotor shaft 60 in the lamella bundle 10 during cooling. The axial displacement is advantageously compensated for by reserving a compensation value in the joining tool when the rotor shaft 60 is joined.

LIST OF REFERENCE CHARACTERS

10 Lamella bundle
12 Opening
14 Web
20 End plate
22 Recess
24 Support face
26 Redirection region
40 Winding
60 Rotor shaft
62 Arrangement region
64 Opening
R Rotor axis
F Joining direction

The invention claimed is:

1. A method for producing a rotor, comprising the steps of:
   providing lamella elements and arranging the lamella elements to form a lamella bundle, wherein the lamella bundle has webs;
   arranging end plates at respective end faces of the lamella bundle, wherein the end plates axially support the lamella bundle;
   axially pretensioning the lamella bundle by winding conductor material around the webs with sufficient pretension to substantially prevent deformation of the webs due to cooling of the lamella bundle after a rotor shaft is arranged in the lamella bundle; and
   arranging the rotor shaft in the fixed or pretensioned lamella bundle.

2. The method according to claim 1, wherein the arranging the rotor shaft in the pretensioned lamella bundle is by press-joining or transverse-joining.

3. The method according to claim 1, wherein the lamella elements are stamped and have a respective stamping burr, and further comprising the steps of:
   orientating the lamella elements in the lamella bundle such that the respective stamping burrs are orientated in a preferred direction; and
   providing a recess in the end plate of the end plates which is orientated toward the preferred direction in order to absorb a deformation of the lamella bundle in a region of the rotor shaft.

4. The method according to claim 3, further comprising the step of:
   orientating the lamella elements in the lamella bundle such that the respective stamping burrs are orientated in an alternating manner.

5. The method according to claim 3, further comprising the step of:
   arranging the rotor shaft in the preferred direction.

6. The method according to claim 1, further comprising the step of:
   arranging the rotor shaft in a joining direction until a desired position is reached, wherein the desired position is located in front of an end position with respect to the joining direction.

7. The method according to claim 1, further comprising the step of:
   radially prefixing the lamella bundle during a winding operation of winding conductor material around the webs.

8. An electric motor, comprising:
   a rotor produced by the method according to claim 1.

9. A rotor, comprising:
   a lamella bundle formed by lamella elements and webs;
   end plates arranged at respective end faces of the lamella bundle, wherein the end plates axially support the lamella bundle;
   conductor material wound around the webs with sufficient pretension to substantially prevent deformation of the webs due to cooling of the lamella bundle after a rotator shaft is arranged in the lamella bundle; and
   the rotor shaft arranged in the lamella bundle,
   wherein at least one end plate of the end plates has a recess which is configured to absorb an axial deformation of the lamella bundle.

10. The rotor according to claim 9, wherein the lamella elements have a respective stamping burr which is orientated in a direction toward the recess.

* * * * *